April 26, 1927.  
W. C. HOOVER ET AL  
GRINDING AND SEPARATING APPARATUS  
Filed Nov. 21, 1923  
1,626,466  
2 Sheets-Sheet 2
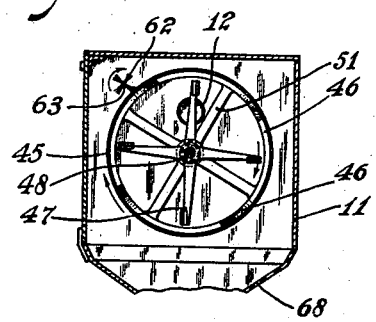
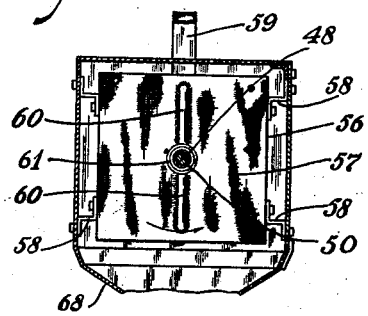
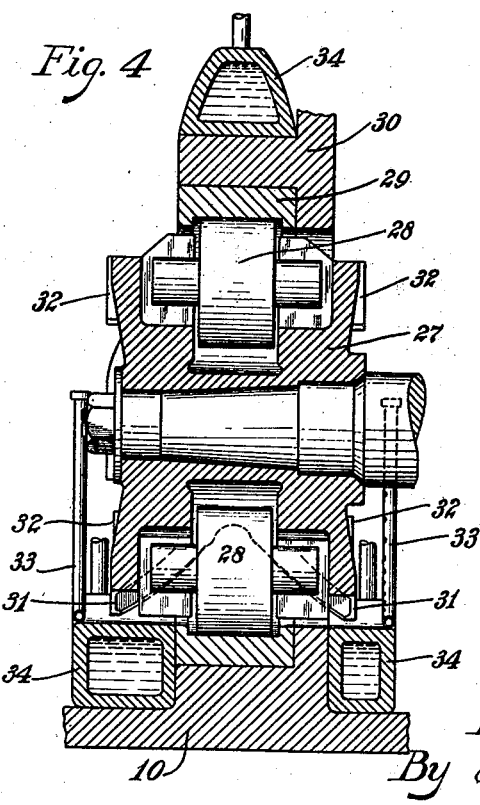
Inventors  
William C. Hoover.  
Roy D. Fritz.  
Edward Frank Cahill.  
By Robert M. Pierson Atty.

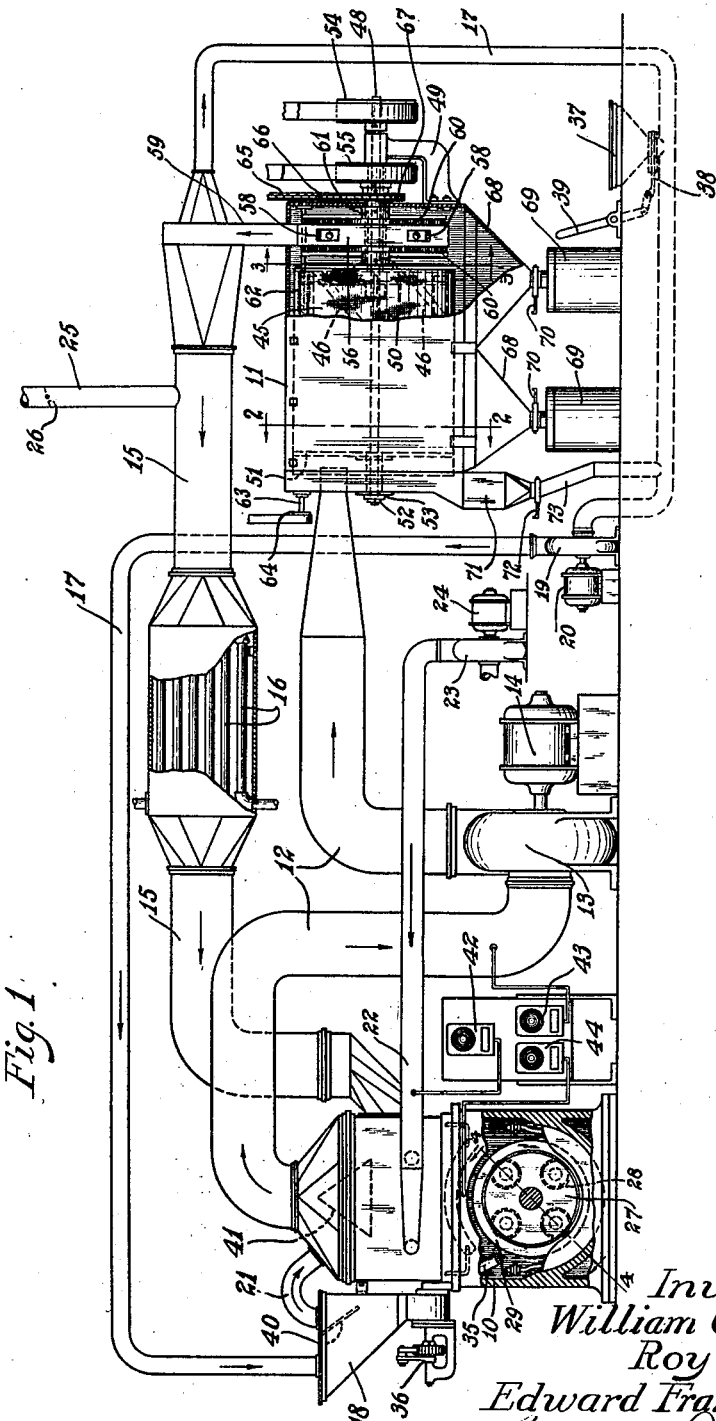

Patented Apr. 26, 1927.

1,626,466

UNITED STATES PATENT OFFICE.

WILLIAM C. HOOVER, ROY D. FRITZ, AND EDWARD FRANK CAHILL, OF AKRON, OHIO, ASSIGNORS TO THE B. F. GOODRICH COMPANY, OF NEW YORK, N. Y., A CORPORATION OF NEW YORK.

GRINDING AND SEPARATING APPARATUS.

Application filed November 21, 1923. Serial No. 676,074.

This invention relates to apparatus for grinding and separating materials and more particularly materials such as hard rubber, which, when finely divided, are inflammable and form explosive mixtures when propelled upon an air current, the present invention being an improvement upon the copending application of Wm. C. Hoover and Ambrose Dwyer, Serial No. 663,586, filed September 19, 1923, Patent Number 1,542,346, granted June 16, 1925.

Our general object is to provide improved apparatus whereby such materials may be economically and safely ground and separated or graded. More specific objects are to provide simple and compact apparatus such as to permit the propelling of a dust-conveying, gaseous current therethrough without excessive leakage of air into the system or of dust laden gases into the surrounding atmosphere; with a small power consumption; and without requiring a large quantity of the gaseous conveying medium. A further object is to provide apparatus of such compact form and arrangement as to be housed in a room of moderate size and height, and thereby to localize such fire and explosion hazard as is present and to enable the operator to maintain close observation and attendance with respect to the entire apparatus. Other objects are to provide an improved, compact, simple and inexpensive dust-collecting unit, and to provide improved material-feeding means whereby the feeding of the material to be ground may be easily effected and accurately controlled.

Of the accompanying drawings:

Fig. 1 is an elevation, with parts broken away and in section, of our improved apparatus in its preferred form.

Fig. 2 is a section of a dust collecting device constituting a part thereof, on line 2—2 of Fig. 1.

Fig. 3 is a section of said device on line 3—3 of Fig. 1.

Fig. 4 is a section of the grinding apparatus, on line 4—4 of Fig. 1.

Referring to the drawings, the apparatus comprises an enclosed, centrifugal mill, the enclosure or casing thereof being designated 10, and an enclosed dust-collecting device, the enclosure or casing thereof being designated 11, said enclosures constituting respective parts of a substantially closed pneumatic circuit. Said circuit includes a conduit 12 leading from the mill to the dust collecting device and provided with a blower 13 driven by a motor 14; a conduit 15 leading from the dust collecting device back to the mill and provided with a pipe coil 16 in an enlarged part thereof; a branch conduit 17 leading from the return conduit 15, adjacent the dust collecting device, to a feed hopper 18 upon the mill, said conduit 17 being provided with a blower 19 driven by a motor 20; and a short conduit 21 leading from the hopper 18 to the mill. A gas-supply pipe 22 leads into the enclosure of the mill from a suitable source of gas-supply (not shown), and said gas-supply pipe is provided with a blower 23 driven by a motor 24 for forcing an inert gaseous medium, such as washed and purified flue gases, into the system, so as to maintain a slightly super-atmospheric pressure in substantially all parts of the system and thereby prevent leakage of air into the system. A branch conduit 25 provided with a damper 26 leads from the return conduit 15 to the atmosphere outside of the building, in order that excessive pressure within the system may be relieved, as gas is injected through the pipe 22, and the pressure within the system thus regulated by means of said damper as well as by the speed of the blower 23. The conduit 25 and damper 26 are also adapted to permit the escape of the air contained within the system at the beginning of operation.

The centrifugal mill comprises a rotor 27 within the casing 10 and a set of centrifugal, grinding rollers 28, occupying respective recesses in the outer periphery of said rotor and having their trunnions journaled in radial slots formed in said rotor at the respective sides of said recesses, said rollers being adapted to run in a crushing or grinding operation against the inner face of a channeled grinding ring 29 secured in a partition-like member 30 mounted in the casing 10 and formed with a large central opening accommodating the rotor 27. The rotor is formed on its outer periphery with pairs of converging flanges or plows 31, 31, adapted to direct the material to be ground into the path of the rollers as the rotor revolves, and with projections or agitators 32, 32 on its side faces adapted to stir up the material within the mill to prevent excessive heating of the same and to throw it upward within the enclosure or casing 10 so as to promote the separation and carrying off of finely ground particles by a gaseous current passing through the enclosure of the mill. A jet pipe 33 is provided at each side of the rotor and adapted to inject numerous jets, preferably of an inert gas, to stir up the finely ground dust, so as to dissipate locally generated heat and to cause the dust to rise and be carried off. Water and steam jackets 34, 34, are mounted in contact with the partition member 30 and provided with suitable supply and discharge pipes for the circulation of a heating or cooling medium therethrough to regulate the temperature within the mill, the best temperature for the grinding of hard rubber, for example, being about 270° F. A pair of feed pipes, one of the same being shown at 35, lead into the casing 10, on respective sides of the partition member 30, from the feed hopper 18, the latter being provided with a pawl-and-ratchet screw-feed device 36 adapted to feed material from the hopper 18 through the pipes 35 into the mill at a determinate rate.

The branch conduit 17 leading from the dust collecting device back to the hopper 18 of the mill is provided with a supply hopper 37, Fig. 1, having a shut-off valve or gate 38, controlled by a hand lever 39, so that material to be ground, placed in the hopper 37, may be discharged therefrom into said branch conduit in quantities as desired, to be carried by a gaseous current therein, impelled by the blower 19, to the feed hopper 18 of the mill. The hopper 18 is adapted to serve as a separating chamber, being of such size as to reduce the velocity of the current and being provided internally with a baffle plate 40 adapted to compel the gaseous current from the pipe 17 to turn sharply upward as it enters the short conduit 21, leading to the enclosure of the mill, so that the particles of material to be ground are, by their momentum and by gravity, impelled to the lower regions of the hopper, out of the current, as the latter makes the sharp upward turn, the particles thus being deposited in the hopper while the current passes on through the conduit 21 to the mill. Mounted centrally in the upper part of the enclosure of the mill, upon brackets or supports not shown, is a pyramid-shaped baffle member 41 adapted to prevent the direct flight of large particles of material into the conduit 12, thus improving the separation of the finely divided from the coarser particles, said baffle also being adapted, by restricting the passage of the gaseous current near the upper end of the casing, to insure such velocity of current as to carry off the finer particles.

The apparatus being adapted for the use of a dust-propelling medium containing carbon-dioxide, a device 42, which may be of known construction, adapted to register the carbon dioxide content of the gaseous current passing into the system, is associated with the pipe 22, and a pressure recording device 43, adapted to register the fluid pressure within the conduit 12, is associated with said conduit. A temperature recording device 44, adapted to register the temperature of the partition member 30, surrounding the grinding ring 29, is associated with said partition member.

The dust collecting device, comprising the enclosure or casing 11, consists in part of a rotary screen 45 within said casing, said screen being open at its end adjacent the conduit 12 to receive the dust laden gaseous current from the latter, and closed at its opposite end. Said screen is internally provided with helical ribs 46, 46 adapted to agitate the material therein and cause the coarser particles or tailings to progress toward the open end of the screen as the latter is rotated, clockwise as viewed in Fig. 2, and within said screen is a rotary agitator 47 adapted to be driven in the same direction as the screen but at a faster speed, further to agitate the material and cause the finer particles to pass through the screen. Said agitator is secured upon a shaft 48 journaled in the end walls of the casing 11 and in a bracket 49 secured to the exterior of said casing. The screen 45 is mounted at its closed end upon a journal-sleeve 50 mounted upon the shaft 48, and near its open end is provided with an internal spider 51 having a hub or journal-sleeve 52 rotatably mounted upon the shaft 48 and adapted to turn in a bearing 53 mounted in the end wall of the casing 11. A drive pulley 54 is secured upon the shaft 48 beyond the bracket 49, for driving the agitator 47, and 55 is a drive pulley secured upon the sleeve 50, between the bracket 49 and casing 11, for driving the the rotary screen 45.

For separating fine particles of material from the relatively slow-moving current in the casing 11, a box 56, having opposite sides closed only by fine mesh wire screens, one of which is shown at 57, (Fig. 3) is supported in the casing 11 by brackets 58, 58 and provided with an outlet conduit 59 leading to the return-conduit 15 and the branch return-conduit 17, the fine mesh screen 57 being adapted to separate the dust from the gaseous current as the latter passes from the conduit 12, through the casing 11 and box 56, to said return-conduits.

Each of said screens is provided with a pair of rotary, radially disposed brushes 60, 60 adapted to sweep the outer faces of the screen. Said brushes are secured upon a journal-sleeve 61, mounted upon the journal-sleeve 50 of the rotary screen 45, the shaft 48 and sleeves 50 and 61 journaled thereon extending through central apertures in the screens 57. A rotary brush 62 adapted to brush the dust from the exterior of the rotary screen 45 is secured upon a shaft 63 journaled in the end walls of the casing 11 and is adapted to be driven, clock-wise as viewed in Fig. 2, by a drive pulley 64 secured upon said shaft, the latter also being provided with a sprocket 65 connected by a sprocket chain 66 with a larger sprocket 67 secured upon the sleeve 61, for driving the radially disposed brushes 60 at relatively slow speed.

The bottom closure of the casing 11 consists of a pair of downwardly tapered, hopper-like portions 68, 68 adapted to receive the screened material from the rotary screen 45 and the fine dust dislodged from the screens 57 by the brushes 60, and to direct the same into closed receptacles 69, 69, positioned under and in closed communication with said hopper-like portions. Each of the latter is provided at its lower end with a shut-off valve or gate 70 so that their outlets may be closed, allowing the ground material to collect within them while the receptacles 69 are removed and replaced.

To receive the tailings from the open end of the rotary screen 45, the casing 11 is formed at its end adjacent thereto with a chute 71, said chute being provided with a shut-off valve or gate 72 from which a tailings pipe 73 leads downward into the branch return-conduit 17, to convey the tailings into the latter so that they will be returned to the mill by the gaseous current in said return-conduit.

In the operation of the apparatus the system is first charged with inert gases by operation of the blower 23, the damper 26 in the conduit 25 being opened to permit the escape of air contained within the system, and the blower 23 may continue to be operated to impel such gases into the system while a corresponding escape is permitted through the conduit 25, with suitable regard to maintaining a proper pressure, temperature and carbon-dioxide content within the system, preferably a pressure but slightly above atmospheric pressure, so as to prevent ingress of air without substantial outward leakage of gases through the bearing-apertures and such other small and unavoidable openings as are present in the system.

Circulation of the gases within the system, from the mill to the dust collecting device, through the conduit 12, and back to the mill through the conduits 15 and 17, is then started by driving the blowers 13 and 19, the dust collecting device is driven, and the material to be ground, deposited in the supply hopper 37, is permitted to pass into the conduit 17, by actuating the hand lever 39. The blower 19 is driven at such high speed as to cause a strong current in the conduit 17, propelling the material into the feed hopper 18, where it is deposited, and is gradually fed into the mill by the feed device 36. At the beginning of the operation, in grinding hard rubber, we preferably circulate steam through the jackets 34 in order to raise the temperature of the mill as quickly as possible, to heat and thereby soften the rubber, to facilitate the grinding thereof. When the frictional heat developed by the mill has raised the temperature of the stock to about 270° F., a cooling fluid instead of steam is circulated through the jackets 34 to prevent further substantial rise of temperature such as might unduly soften or otherwise undesirably affect the rubber.

The current through the mill, impelled by the blower 13, carries the ground material through the conduit 12 and discharges it into the rotary screen 45 through the open end of the latter, and also assists in causing the finer particles to pass through said screen. The current, passing onward at reduced velocity through the screens 57 into the box 56 and upward through the conduit 59, deposits the floating particles of dust upon said screens, and as such dust collects in quantity the brushes 60 dislodge it therefrom in masses of such weight as to fall by gravity into the adjacent hopper-like portion 68 of the casing 11 and pass therefrom into the receptacle 69 thereunder, while screened material from the rotary screen 45 falls into the receptacles 69, and the tailings from said rotary screen pass through the chute 71 and pipe 73 into the feed-conduit 17 and are thus returned to the mill.

Gaseous jets injected into the mill through the pipes 33 serve to stir up the finely ground material and prevent excessive local temperatures at the grinding position, and the temperature of the mill and the gases within the system may also be regulated by circulating a heating or cooling fluid through the pipe coil 16 in the conduit 15. A heating fluid may be used therein at the beginning of the operation, to expedite the heating of the material and gases within the system to proper grinding temperature, and a cooling fluid then circulated in said coil to prevent excessive temperatures.

The apparatus, being of simple construction, may be of very compact form, with few joints or openings permitting leakage, and the dust collecting device is such as not to require to be opened to the atmosphere as an incident to dislodging the dust from the screens. The system thus may be kept closed throughout a long period of operation, and the apparatus is almost entirely automatic, the operator, in normal operation, being required only to deliver to it the material to be ground and to remove the finished product. The apparatus is very economical both in construction and in operation, may be housed in small space, and may be operated with a higher degree of safety in the grinding of inflammable or explosive materials than apparatus heretofore used for this purpose.

Our invention is susceptable of modifications within its scope and we do not wholly limit our claims to the specific construction shown.

We claim:

1. Grinding and separating apparatus comprising an enclosed mill, a conduit leading from the enclosure of said mill and adapted to conduct therefrom a gaseous current charged with ground material, a chamber into which said conduit discharges, a rotary screen mounted in said chamber in position to receive said current from said conduit, and means for impelling the gaseous current through the mill, conduit and chamber said screen having an open end adjacent said conduit to receive the current therefrom, the opposite end of the screen being substantially closed, and said screen being internally provided with means adapted to cause coarser particles of the material to progress toward said open end as the screen is rotated.

2. Grinding and separating apparatus comprising an enclosed mill, a conduit leading from the enclosure of said mill and adapted to conduct therefrom a gaseous current charged with ground material, a chamber into which said conduit discharges, a rotary screen mounted in said chamber in position to receive said current from said conduit, means for impelling the gaseous current through the mill, conduit and chamber, an air-filter device mounted in the same chamber with said screen and constituting the principal outlet of said chamber, and means for dislodging accumulated material from said air-filter device, the screen being of such large conductive capacity with relation to that of the conduit as to provide that the ground material carried into the screen by the current through the conduit will be in part deposited therein and sifted therethrough and in part carried onward by the current to the air-filter device.

3. Apparatus for separating finely divided material from a gaseous current, said apparatus comprising a chamber, a conduit discharging into said chamber, the latter being of such size as to reduce the velocity of a current discharged thereinto from said conduit, a rotary screen so mounted in said chamber as to receive the gaseous current from said conduit, an air-filter mounted in said chamber, said air-filter having a screened face disposed substantially perpendicularly of the axis of said rotary screen, and a member adapted to rotate about said axis and, in so rotating, to sweep said screened face of the air-filter.

4. Apparatus for separating finely divided material from a gaseous current, said apparatus comprising a chamber, a conduit discharging into said chamber, the latter being of such size as to reduce the velocity of a current discharged thereinto from said conduit, a rotary screen so mounted in said chamber as to receive the gaseous current from said conduit, an air-filter mounted in said chamber, said air-filter having opposite screened faces disposed substantially perpendicularly of the axis of said rotary screen, and members adapted to rotate about said axis and, in so rotating, to sweep said screened faces.

5. Grinding and separating apparatus comprising an enclosed mill, a dust collecting device, and conduits connecting the two in a closed circuit, said conduits including a branch conduit leading from the dust collecting device to the mill, means for feeding material to be ground into said branch conduit, and a blower in said branch conduit.

6. A dust-collecting device comprising a chamber, a rotary screen therein, a stationary screen substantially closing one end of said rotary screen and constituting the principal outlet from said chamber, means for discharging a gaseous current into the other end of said rotary screen, and means for dislodging dust from said stationary screen.

7. Grinding and separating apparatus comprising an enclosed mill, a dust collecting device, conduits connecting the two in a closed circuit, said conduits including a branch conduit leading from the dust collecting device to the mill, a tailings-conducting conduit leading from said dust-collecting device into said branch conduit, a feed-hopper constituting a separating chamber in said branch conduit, and means for feeding material from said feed hopper into the mill at a determinate rate.

In witness whereof we have hereunto set our hands this 17th day of November, 1923.

WILLIAM C. HOOVER.
ROY D. FRITZ.
EDWARD FRANK CAHILL.